United States Patent [19]

Smith

[11] Patent Number: 4,859,090
[45] Date of Patent: Aug. 22, 1989

[54] ROTATING CONDUCTIVE HEAT TRANSFER DEVICE

[75] Inventor: Dennis W. Smith, Phoenix, Ariz.

[73] Assignee: Honeywell Inc., Minneapolis, Minn.

[21] Appl. No.: 236,474

[22] Filed: Aug. 25, 1988

[51] Int. Cl.$^4$ .................. F16C 33/32; F16C 33/60
[52] U.S. Cl. .................................. 384/463; 384/506;
384/476; 384/492; 384/516; 384/517; 384/518;
384/522; 384/912; 384/493
[58] Field of Search .............. 384/463, 506, 476, 912,
384/492, 522, 518, 516, 517, 493

[56] References Cited

U.S. PATENT DOCUMENTS

| | | | |
|---|---|---|---|
| 1,287,225 | 3/1917 | Cheney | 384/522 |
| 3,198,735 | 8/1965 | Lamson et al. | 384/463 |
| 3,360,312 | 12/1967 | DeWit et al. | 384/492 |
| 4,227,755 | 10/1980 | Lundberg | 384/518 |

*Primary Examiner*—Lenard A. Footland
*Attorney, Agent, or Firm*—Howard Paul Terry

[57] ABSTRACT

A rotating, conductive, heat transfer device is provided. The device includes an outer race having an axis, an inner race coaxial with the outer race, and a plurality of bearing balls disposed in a radial direction between the inner race and the outer race. The device also includes a plurality of separators disposed alternately in a peripheral direction between the bearing balls. The device has a first track and a second track, supported by the inner race, for supporting the separators. The inner race has a first, fixed, inner ring portion with a first bearing surface, and has a second, separable, inner ring portion with a second bearing surface. The outer race has a third bearing surface, disposed in a radial direction opposite to the first bearing surface. The outer race also has a fourth bearing surface, disposed in a radial direction opposite to the second bearing surface. The first and second and third and fourth bearing surfaces are in contact with a spherical surface of each bearing ball. The device also has a plurality of coil springs, which urge the second inner ring portion in an axial direction toward the first inner ring portion, thereby applying first and second and third and fourth forces normal to the respective first and second and third and fourth bearing surfaces, for providing heat conduction from one race to the other race.

10 Claims, 3 Drawing Sheets

ROTATING CONDUCTIVE HEAT TRANSFER DEVICE

The invention generally relates to a rotating conductive heat transfer device, and in particular the invention relates to a rotating conductive heat transfer device having bearing balls with load adjusting springs.

BACKGROUND OF THE INVENTION

Patent application U.S. Ser. No. 85,671, filed 8-14-87, now U.S. Pat. No. 4,795,279, which is assigned to the same assignee as this application, shows a ball bearing device which has separators.

Various satellite systems require heat to be transferred across a rotatable joint. Some of these, like the suspension system for an infra red sensor, require operation at temperatures as low as 10 degrees Kelvin (10° K.), others, like waste heat rejection systems, operate at temperatures in the 300°–400° K. range. In all of these cases, the requirements of low torque and low temperature drop across the joint are important.

There are basically five prior art devices now used for transferring heat across a rotating joint. The following are descriptions of each device, along with limitations of each device.

First, a flexible cable device is provided, wherein flexible cables attach at one end to a stationary side and at the other to a rotating side. Heat is conducted along the length of the cables, so that the shorter the cables, the lower the temperature drop across the joint. Longer cables, however, provide lower torque. Thus, a compromise is required. To complicate this, many materials become stiffer at low temperatures, thus increasing the torque. The main disadvantage of flexible cables is the limited rotation due to cable windup.

Second, a radiation device is provided, which has a series of concentric fans, disposed on both rotating and stationary portions of a rotary joint. The fins are designed to fit inside one another so they do not contact when the unit is assembled. Heat conducted down the length of one set of fins can then be radiated to the other. Because there is no contact between the rotating and stationary fin sets and because of operating in a vacuum there is no viscous coupling, and there is no torque component due to the heat transfer device. The disadvantage of this device is that radiation alone provides poor heat transfer at low temperature differentials. It is therefore difficult, even with very large and heavy radiators, to transfer sufficient heat without unacceptably large temperature differentials.

Third, a radiation and convection device is provided, wherein seals are added to the radiation device, described above, and a gas is used to provide convection heat transfer to augment the radiation. This does reduce the temperature differentials, at equivalent heat transfer rates, to acceptable levels; but the seals present three problems. First, their drag torque is unacceptably high. Second, if they leak, the gas will escape and the heat transfer efficiency will be reduced to that of a pure radiator and the seal torque will remain, thus leaving a device that has high torque and poor heat transfer efficiency. Third, seal performance, drag torque and leak rate, each is a function of operating temperature. The low temperature performance is therefore frequently poorer than room temperature performance.

Fourth, a heat pipe device is provided, wherein a higher heat transfer efficiency than obtained with the radiation and convection device can be obtained. This device is much like the radiation and convection device, except that instead of using a pure gas as a convection medium, a fluid is chosen that will evaporate at the temperature of a hot side and condense at the temperature of a cold side. This system utilizes the latent heat of vaporization of the fluid in order to transfer greater quantities of heat from the hot to the cold side. The same seal limitation exists with this system and an additional limitation of operating temperature range is added. Because of the limited temperature differential and the specific boiling points of various fluids, a different operating fluid is required for each desired operating temperature. This constraint requires exact knowledge of the operating characteristics of the system in advance of the actual use.

Fifth, a rotary fluid coupler device is provided. This coupler does not transfer heat to a rotating device, across an interface and then to a final destination. This coupler uses liquid to absorb the heat from a source, and transfers the liquid across the rotating joint and to a heat sink. The main limitations of this device are high drag torques, and complicated seal and passage design to accommodate two fluid paths.

SUMMARY OF THE INVENTION

According to the present invention, a rotating conductive heat transfer device is provided. This device comprises an outer race having an axis, an inner race, a plurality of bearing balls radially disposed between the inner race and the outer race, a plurality of separators peripherally disposed between the bearing balls, a first track and a second tract for supporting the separators, the inner race having a first inner ring portion with a first bearing surface and having a second inner ring portion with a second bearing surface, the outer race having a third bearing surface disposed radially opposite to the first bearing surface and having a fourth bearing surface disposed radially opposite to the second bearing surface so that each said bearing ball is in contact with said first and second and third and fourth bearing surfaces, and spring means urging the first inner ring portion toward the second inner ring portion for applying first and second and third and fourth normal forces at the respective first and second and third and fourth bearing surfaces.

By using the heat transfer device according to the invention, by problems of the prior art devices are avoided.

The foregoing and other objects, features and advantages will be apparent from the following description of a preferred embodiment of the invention as illustrated in the accompanying drawings.

DESCRIPTION OF THE PREFERRED EMBODIMENT

Figure 2:
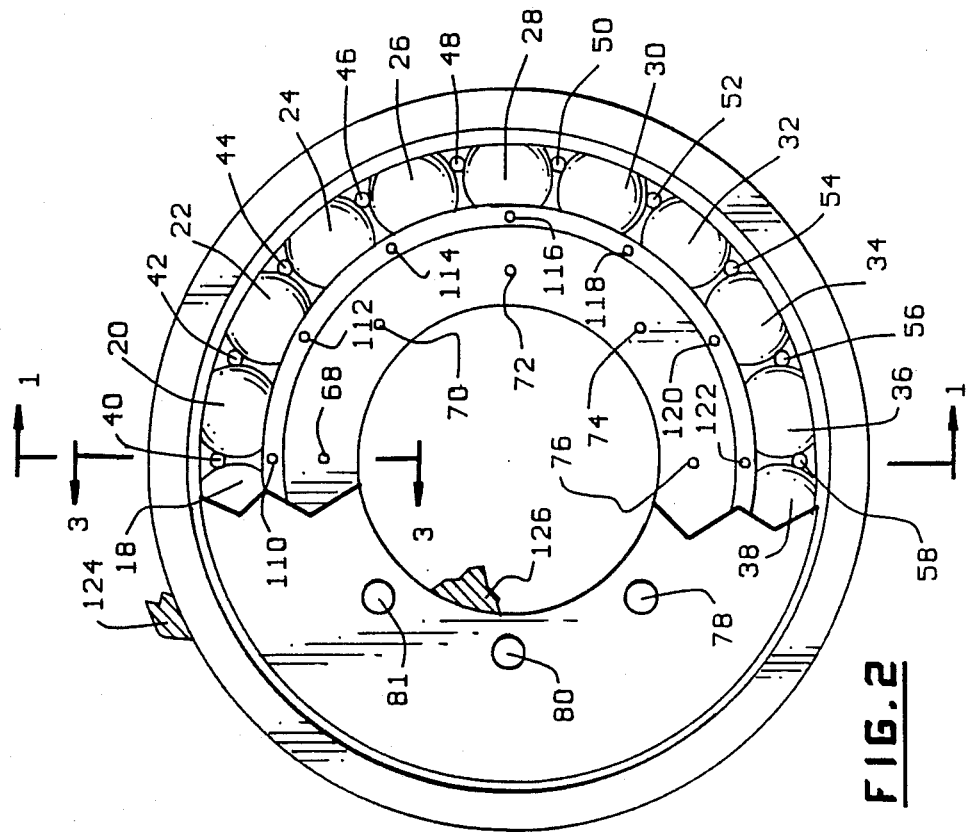
FIG. 2 is a sectional view, which is partly cut away, as taken along the line 2—2 of FIG. 1.
Figure 1:
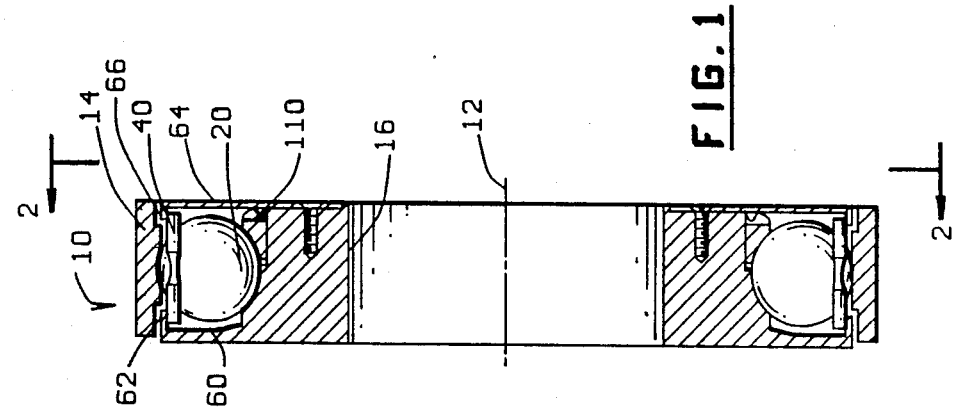
FIG. 1 is a sectional view, as taken along the line 1—1 of FIG. 2, of a heat transfer device according to the invention.

As shown in FIGS. 1 and 2, a rotating conductive, heat transfer device 10 is provided. Device 10, which has a rotation axis 12, includes an outer ring or race 14 and an inner ring or race 16. Device 10 also includes a plurality of bearing balls 18, 20, 22, 24, 26, 28, 30, 32, 34, 36, 38, which are radially disposed between inner race 16 and outer race 14. Device 10 also has a plurality of rollers or separators 40, 42, 44, 46, 48, 50, 52, 54, 56, 58, which are peripherally disposed between the respective bearing balls.

In FIGS. 1 and 2, inner ring 16 has a first side plate 60, which is integral therewith. Plate 60 has a first roller track 62, which is integral therewith. Inner ring 16 also has a second side plate 64, which has a second roller track 66, that is integral therewith. Plate 64 is connected to inner ring 16 by a plurality of peripherally spaced screws 68, 70, 72, 74, 76, 78, 80, 81.

Figure 3:
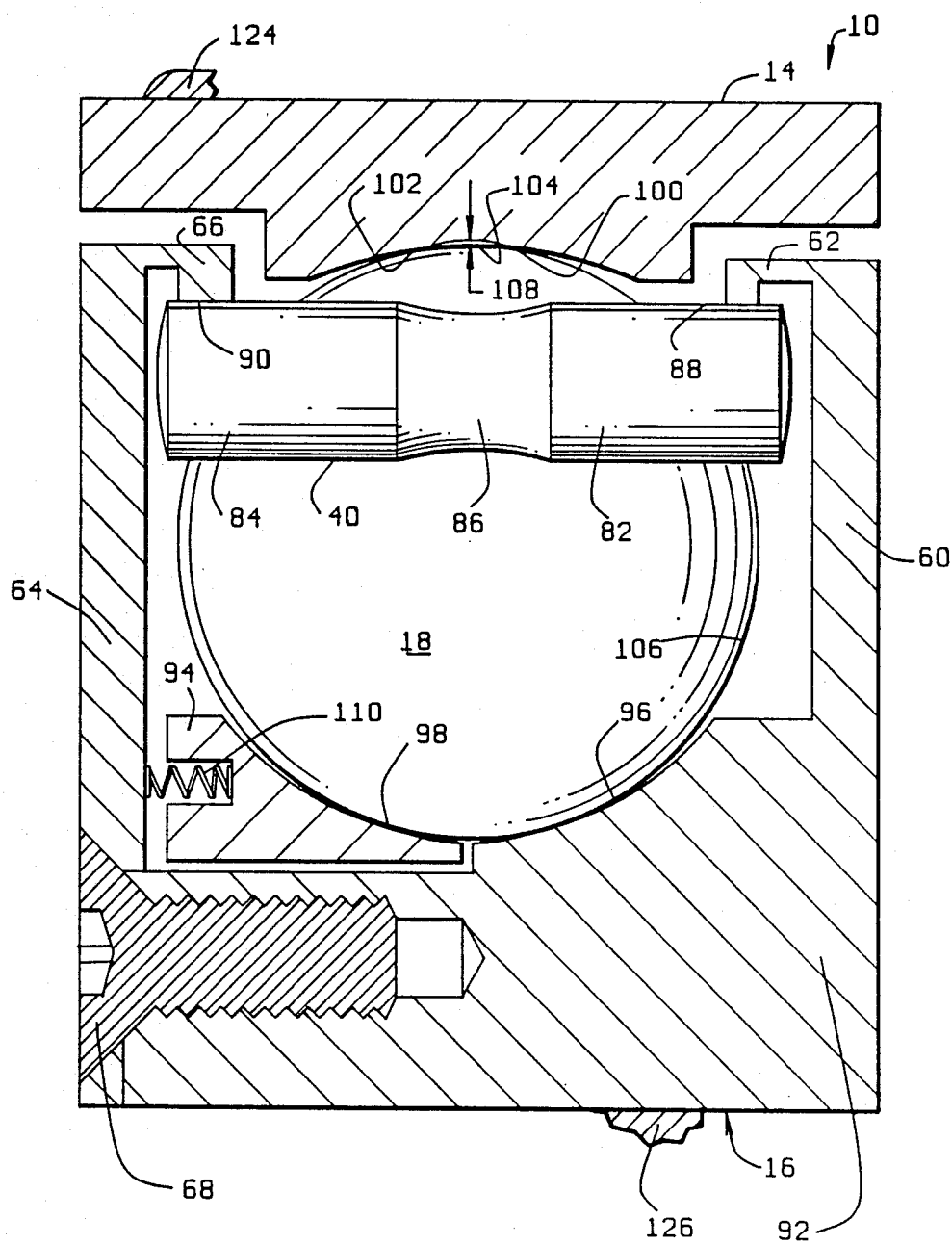
FIG. 3 is a sectional view as taken along the line 3—3 of FIG. 1.

In FIG. 3, separator 40, which is a typical separator, has a first cylindrical portion 82, a second cylindrical portion 84 and a center recessed portion 86. First track 62 has an inner rolling surface 88. Second track 66 also has an inner rolling surface 90. Inner race 16, which is a split ring, has a fixed ring portion 92. Inner race 16 also has a movable ring portion 94, which is separable or removable from fixed ring portion 92.

In FIG. 3, fixed ring portion 92 has a first, inner, bearing surface 96. Movable ring portion 94 has a second, inner, bearing surface 98. Surfaces 96, 98 together have a profile in the shape of a Gothic arch. Outer ring 14 has a third bearing surface 100 and has a fourth bearing surface 102. Surfaces 100, 102 also have a profile in the shape of a Gothic arch. Outer ring 14 has a third, center, surface portion or apex portion 104. Bearing ball 18, which is a typical bearing ball, has a spherical surface 106, which is separated from the apex portion 104 by a gap 108.

In FIG. 2, movable ring portion 94 has a plurality of spring members or coil springs 110, 112, 114, 116, 118, 120, 122. When first plate 60 is assembled to fixed ring portion 92 by the screws 68, 70, 72, 74, 76, 78, 80, 81, the springs 110, 112, 114, 116, 118, 120, 122 bear against movable ring portion 94, thereby causing forces to act normal to surfaces 96, 98 and causing reaction forces to act normal to surfaces 100, 102.

The amount of force applied by each spring is proportional to the amount of each force normal to surfaces 96, 98, 100, 102. The spring forces are substantially equal to each other. The forces on surfaces 96, 98, 100, 102 are substantially equal to each other. The amount of heat flow between races 14, 16 is proportional to the amount of each force on surfaces 96, 98, 100, 102, which is proportional to the amount of the force applied by each spring. The spring is designed to suit the desired heat flow rate between connecting or adjoining parts 124, 126, which connect to respective races 14, 16, as shown in FIG. 3.

In FIG. 3, the contact area at each surface 96, 98, 100, 102 with ball surface 106 is maintained relatively wide in order to maximize heat conduction therethrough. Thus, the curvature of surfaces 96, 98, and the corresponding curvature of surfaces 100, 102 are relatively tight curvatures. The gap 108 is relatively small for this purpose. Also, when the parts 92, 94 are pressed together by spring 110, in FIG. 3, the contact angle of inner race 16 is substantially the same as the contact angle of outer race 14.

Separator 40, which is a typical separator, is designed to allow rolling friction and to minimize sliding friction. Because sliding is minimized, thin gold plating on typical separator 40 can be used for lubrication and corrosion protection for the easily oxidized copper. Such gold plating deforms relatively easily, thereby increasing the effective contact area with adjacent bearing balls 18, 20.

Figure 4:
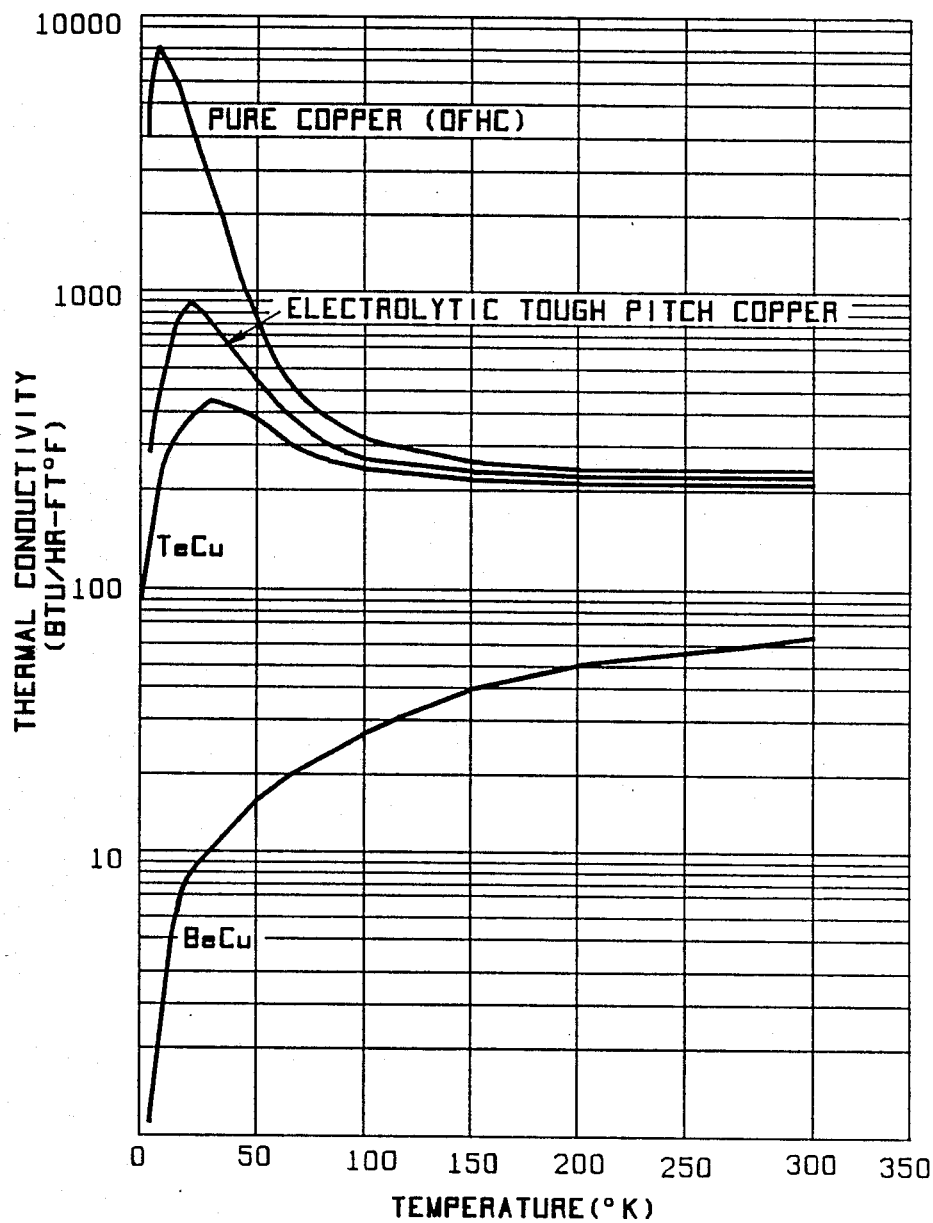
FIG. 4 is a graph of thermal conductivity versus temperature, which shows four curves of different copper alloys.

For optimum heat transfer at low cryogenic temperatures, high purity copper material is used in rings 14, 16 and balls 18–38. As shown in FIG. 4, high purity copper material, or pure copper material (OFHC), is better than other copper alloys for heat conduction at a very low temperature. FIG. 4 shows that high purity copper has a thermal conductivity that increases dramatically, as the temperature drops from approximately 100 degrees K to 10 degrees K.

For optimum heat transfer at temperatures other than the very low temperatures, a material with a relatively low modulus of elasticity is used, because it has a relatively higher deformation than a material with a relatively high modulus. Such low modulus material has a relatively higher deformation and a relatively larger contact area for a given load for better heat conductivity.

For optimum heat transfer at a relatively high temperature, liquid lubricant is used to improve heat transfer and heat conductivity between the bearing ball and the inner and outer races. The liquid lubricant is one that will not produce an elastohydrodynamic film at surfaces 96, 98, 100, 102, for the given load and ball speed at said surfaces, because such a film substantially increases the contact resistance to heat flow.

The advantages of device 10 are indicated hereafter.

First, device 10 overcomes the problems of the respective prior art devices, as described heretofore in the background of the invention, including the problems of limited rotation of the flexible cable device, poor heat transfer capability of the radiation device, high drag torque and seal leaks of the radiation and convection device, limited temperature range and seal leaks of the heat pipe device, and the high drag torque and complicated seals of the rotary fluid coupler device.

Second, different features in device 10 can be provided for different operating tempeatures and conditions, including springs 110 having a relatively high spring rate for providing a high heat transfer rate, and including a high purity copper ball 18 and races 14, 16 which provides increasing heat conductivity with decreasing temperature below 100 degrees Kelvin (K), and including eliminating sliding friction and using a thin gold plating on ball 18 and races 14, 16 for increasing overall heat conduction therethrough at all temperatures, and including using a low modulus of elasticity on ball 18 and races 14, 16 for increasing overall heat conduction therethrough and for increasing heat conductivity through points of contact therebetween.

While the invention has been described in its preferred embodiment, it is to be understood that the words which have been used are words of description rather than limitation and that changes may be made within the purview of the appended claims without departing from the true scope and spirit of the invention in its broader aspects.

For example, spring members 110, 112, 114, 116, 118, 120, 122 can be another type of spring member instead of a coil spring, such as a wave washer, or an elastomer member, or a Belleville washer.

The embodiments of an invention in which an exclusive property or right is claimed are defined as follows.

1. A heat transfer device comprising:
   an outer race having an axis;
   an inner race coaxial with the outer race;
   a plurality of bearing balls disposed in a radial direction between the inner race and the outer race;
   a plurality of separators disposed alternately in a peripheral direction between the bearing balls;
   a first track and a second track for supporting the separators;
   said inner race having a first inner ring portion with a first bearing surface and having a second inner ring portion with a second bearing surface;
   said outer race having a third bearing surface disposed in a radial direction opposite to the first bearing surface;
   said outer race having a fourth bearing surface disposed in a radial direction opposite to the second bearing surface;
   said first and second and third and fourth bearing surfaces being in contact with each bearing ball; and
   spring means urging the second inner ring portion in an axial direction toward the first inner ring portion for applying first and second and third and fourth forces normal to the respective first and second and third and fourth bearing surfaces.

2. The device of claim 1, wherein
   the bearing balls and inner race and outer race are composed of a material of relatively high heat conductivity.

3. The device of claim 1, wherein
   the bearing balls and inner race and outer race are composed of relatively high purity copper for providing relatively high heat conductivity at temperatures below 100 degrees Kelvin.

4. The device of claim 1, wherein
   the bearing balls and inner race and outer race are coated with a thin gold plating for increasing heat conductivity at points of contact therebetween.

5. The device of claim 1, wherein
   the bearing balls and inner race and outer race are composed of a material of relatively low modulus of elasticity for increasing heat conductivity through points of contact therebetween by increasing contact point deformation.

6. The device of claim 1, wherein
   the spring means has a relatively high spring rate for increasing heat conductivity through points of contact therebetween by increasing contact forces.

7. The device of claim 1, wherein
   the bearing balls and inner race and outer race are dimensioned so as to substantially eliminate sliding friction therebetween and are coated with a thin gold plating for increasing heat conductivity, corrosion protection and lubrication between points of contact.

8. The device of claim 1, wherein
   the spring means includes a plurality of coil springs.

9. The device of claim 1, wherein
   the first and second bearing surfaces have a profile of a Gothic arch, and wherein the third and fourth bearing surfaces have a profile of a Gothic arch.

10. The device of claim 1, wherein
    the third and fourth bearing surfaces have an apex bearing surface therebetween, and each bearing ball has a spherical surface, the apex bearing surface and the spherical surface forming a gap therebetween, the size of the gap being dependent on the contact angle between the ball and the third and fourth bearing surfaces and the curvature ratio between the ball and the third and fourth bearing surfaces, and that the contact angle and curvature ratio can be optimized to provide maximum areas of contact at each side of the gap, for increasing heat conductivity at the areas of contact.

* * * * *